Sept. 6, 1932.  E. L. THEARLE  1,876,524
DYNAMIC BALANCING MACHINE
Filed July 5, 1929   2 Sheets-Sheet 1
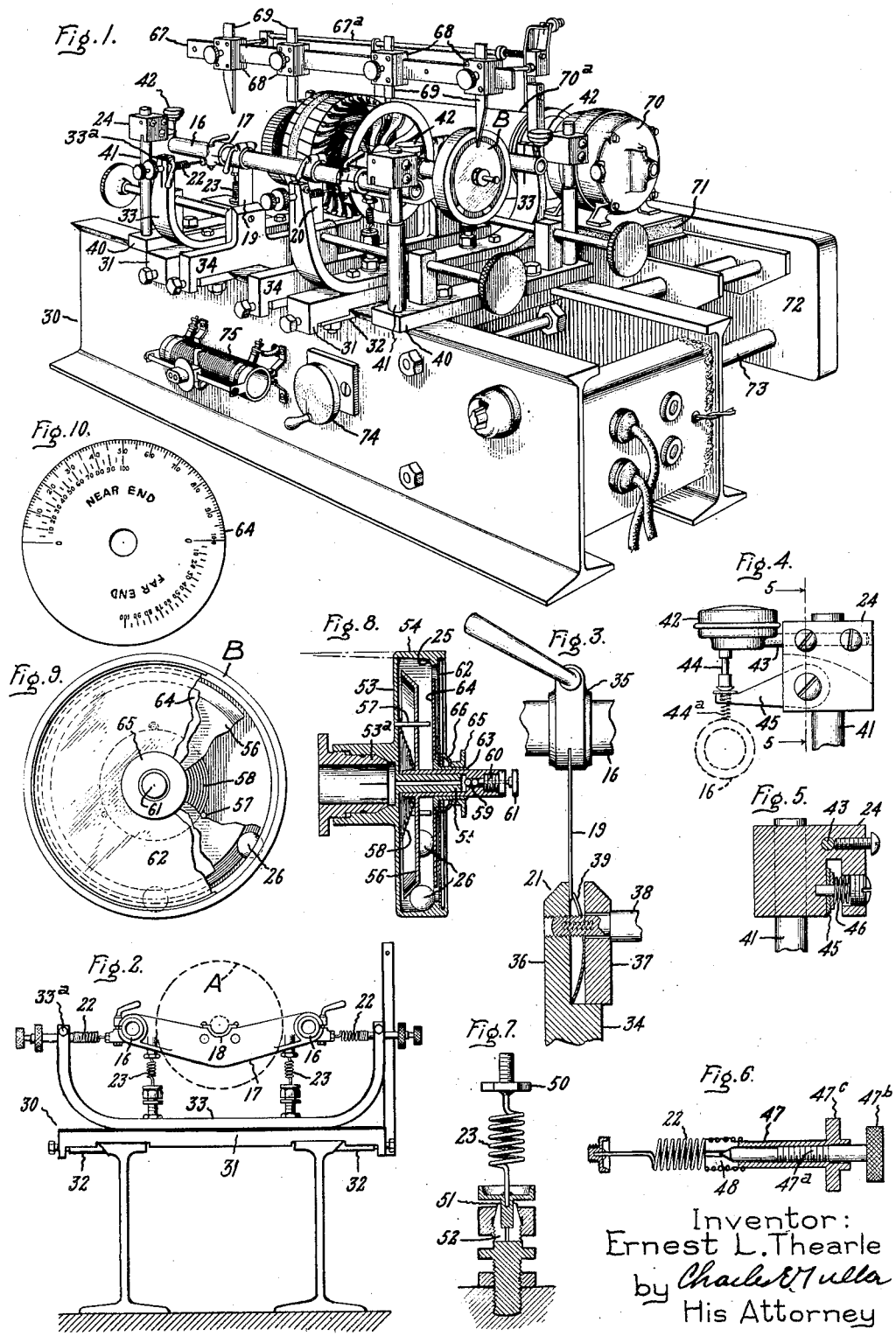
Inventor:
Ernest L. Thearle
by Charles E. Mulla
His Attorney Sept. 6, 1932.   E. L. THEARLE   1,876,524
DYNAMIC BALANCING MACHINE
Filed July 5, 1929   2 Sheets-Sheet 2
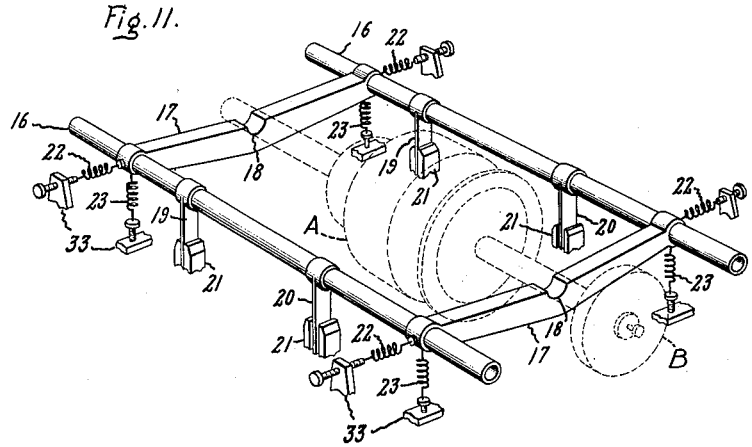
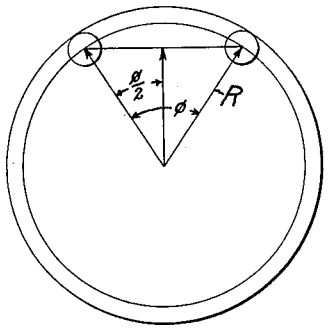
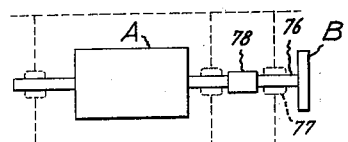
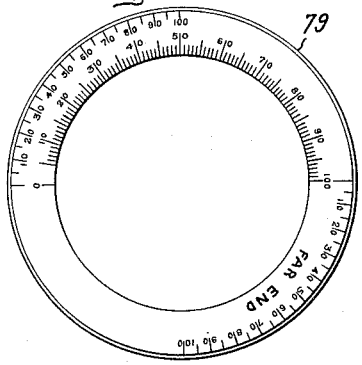
Inventor:
Ernest L. Thearle,
by Charles E. Tullar
His Attorney Patented Sept. 6, 1932

1,876,524

UNITED STATES PATENT OFFICE

ERNEST L. THEARLE, OF SCHENECTADY, NEW YORK, ASSIGNOR TO GENERAL ELECTRIC COMPANY, A CORPORATION OF NEW YORK

DYNAMIC BALANCING MACHINE

Application filed July 5, 1929. Serial No. 375,934.

The present invention relates to machines for dynamically balancing the rotating elements of various kinds of apparatus.

The object of my invention is the provision of an improved machine by means of which the extent to which the mass of a rotating element or body is out of balance can quickly and easily be determined and also the amount and exact location of the mass or balancing weight which should be added to or removed therefrom, and this without in any way disturbing the position of the said element once it is mounted in place.

A further object of my invention is an improved method of balancing rotors of various kinds, especially those designed to run at relatively high speeds.

My invention is of great utility in balancing the rotors of high speed, dynamo electric machines which are manufactured in very large quantities and especially of the smaller machines where the cost of balancing is a material factor in the cost thereof and will be described in that connection for illustration purposes only, it being understood that the invention is not so limited but is capable of use in balancing a great variety of rotating elements or bodies.

For a consideration of what I believe to be novel and my invention, attention is directed to the accompanying description and the claims appended thereto.

In the drawings which are illustrative of my invention, Fig. 1 is a perspective view of a balancing machine; Fig. 2 is an end view of the cradle which supports the body or rotor which is to be balanced; Fig. 3 is a view partly in elevation and partly in section of one of the fulcra of the cradle which supports the body to be balanced; Fig. 4 is an enlarged side view of a vibration indicating device; Fig. 5 is a section view taken on line 5—5 of Fig. 4; Figs. 6 and 7 show means for adjusting the springs which support the cradle; Fig. 8 is a vertical section of the balancing head; Fig. 9 is an end view of the weight carrying balancing head; Fig. 10 is a front view of the dial used in said head; Fig. 11 is a diagrammatic view illustrative in part of the principles involved in the machine; Fig. 12 is a diagrammatic view of the balancing head and the movable weights contained therein; Fig. 13 is a slight modification of the invention wherein the balancing head has its own shaft, and Figs. 14 and 15 are views of a different form of scale.

For the purpose of outlining the principles upon which my improved machine operates reference will first be made to Fig. 11. A indicates the rotatable body which is to be balanced and which in this case is the armature of a dynamo electric machine although, as previously stated, this is used as an illustration and not as a limitation of my invention. It is shown in dotted lines so as not to obscure the other parts, and its driving motor is omitted. It is mounted for rotation in a holder of any suitable construction, hereinafter called a cradle which, as an illustration of a suitable construction, comprises a pair of light longitudinally extending tubes 16 and two cross members 17 which carry bearings 18 in which the shaft of the body to be balanced is located. The cradle is held in its horizontal position and at a fixed distance above the supporting base or frame by set of springs and also by four vertical fulcrum members arranged in pairs 19 and 20 of which only a single pair is in action at any one time. The members of each pair are arranged in the same plane which is at right angles to the axis of the body to be balanced. These members are made of thin metal and in turn are supported by the base or main frame of the machine through releasable clamps 21. The two members which are active at any one time hold the cradle at a fixed elevation, in other words, prevent up and down movements, and they also prevent it from moving sidewise at the points of support. On the other hand, being thin and quite flexible they permit the portion of the cradle remote therefrom, say the right hand end, to vibrate up and down, and also permit it to have a limited sidewise movement. This sidewise or lateral movement causes a slight twisting and bending of the members. To state the matter another way, the supports of a pair of fulcrum members at their points of attachment to the cradle, hold one part of the cradle in a fixed position while permitting the other end of the cradle and its supported body A to wabble or vibrate, subject to the action of supporting springs which will be described later. With the construction described and illustrated it is apparent that a vertical plane passing transversely through and including the supports will be intersected by the axis of the body being balanced, and that the point of intersection of the plane and axis will be the pivotal point about which the free end of the body being balanced moves with two degrees of freedom. In other words, the outer or free end of the shaft which is remote from the pivot will, due to the lack of balance of the body, move bodily in an approximately circular path, and that taken as a whole, the axis of the body while being rotated will travel in a conical path, the apex of which is the pivotal point above mentioned. The balancing head which will be referred to later on and which carries movable weights, also moves in a similar path until such time as the weights adjust themselves to their correct positions. The members have been described as being made of thin vertical strips or pieces of metal, and, while this has been found to be the most effective support because of the lack of friction, other forms of supports may be used provided they do not create undue friction. In this particular embodiment of my invention, the supports lie in planes which pass at right angles to the axis of rotation and through the parts of the body A where the corrective weights or mass is to be applied or removed, as the case may be. For convenience these may be termed "planes of correction". To simplify the description reference will be made hereafter to adding weight to some part of the body undergoing balancing, but it is to be understood that the same effect may be obtained by removing weight from the heavy side of the body, but this is in many cases a more difficult thing to do, especially where the body is small and is complicated by reason of the various parts used in making armatures. The fulcrum members may be shifted to-and-fro with respect to the body so as to be aligned with whatever part of the body it be desired to add weight to. This will be determined chiefly by the size, shape and construction of the body. In the case of coil wound armatures for small machines it will be found convenient to align one pair of members with one of the end binding bands for the coils and the other with the second end band or with the ventilating fan when such a fan is used. However, since a considerable variation may be made in this respect, no further directions need be given.

In order that the cradle may freely vibrate under the influence of the unbalanced mass within the body A and to obtain the desired motion, it is elastically supported. This elastic support may, without departing from my invention, be made in a variety of ways. To attain this result in a simple manner, and as one embodiment of the invention, four horizontally disposed compression springs 22 are provided, each having its inner end connected to the cradle and its outer end secured in a fixed position on some part of the main frame. In addition, four vertically disposed compression springs 23 are provided, each having its upper end attached to the cradle and its lower end secured in a fixed position on the main frame. Each spring is mounted at one or both ends in adjustable means so that their compression effect may be conveniently changed to suit the operating conditions.

To the body A is attached, as for example by mounting it on the shaft thereof, what for convenience may be termed a "balancing head" B. The head may be made in a variety of ways, the description following being directed to one form which is illustrative of my invention and not as a limitation unless so specified in the claims. It may be here stated that one such head may be used for a variety of sizes or kinds of bodies, provided the parts are so arranged as to size of shaft and shaft opening within the head that this can be done. Suitable adapters may be employed where the shaft diameter is appreciably less than that of the bore of the head. The head should be carefully made and be carefully balanced so that no error of final balance of the body may be traceable to it. Just inside of the rim of the head is inserted a circular ball race 25 concentric with the axis of the head which race should be carefully hardened and ground to prevent wear and deformation. In the race thus formed are mounted and suitably retained one or more spheres or balls 26 of equal weights which may be made of steel. Where only one ball is employed the position of the unbalanced part of the body A will be indicated but not the amount of the corrective weight required but when two or more balls are provided they serve to indicate not only the position of the weight to be added but its amount as well. While more than two balls may be employed, the use of a larger number somewhat complicates the determination of the amount of weight to be added and it is preferable, at least in many cases, to use only two. It is desirable that the combined weight of the balls be such that it is great enough to compensate for the lack of balance of the body. This means, of course, that for bodies of substantially different weight, different heads and weights will be employed. As a practical matter it is also desirable to so select the weights that they will, when the head and body are rotated, move to and occupy positions where the angle between them is substantially less than 180° because under such conditions the positions of the weights may be more accurately observed than where they are widely spaced.

In addition, the balancing head is provided with a simple form of clutch which acts on the balls to hold them in the position they take when the parts are rotated at balancing speed, i. e. above the critical speed of the body in its particular mounting and where the body A tends to rotate about its principal axis instead of its apparent geometrical axis. By "critical speed" is meant the critical speed of the combined rotor and its supporting cradle as determined by their mass distribution and the stiffness of the springs which support them. The clutch is first opened to free the balls and permit them automatically to assume their balancing positions, and later closed to clamp them in their adjusted positions, and this while the body is being rotated, as will appear more in detail later on. A clutch is a convenient and desirable way to ascertain the adjusted position of the balls, especially after the body has stopped rotating, but it is not necessarily employed since other means may be used to ascertain the relative position of the balls and head when the body and the balancing head are being rotated.

The extreme simplicity of the method employed in balancing rotating bodies may be ascertained from a consideration of diagrammatic Fig. 12. By means of the method here involved the operator is enabled to determine not only the amount of weight which should be added but also the correct angular position on the body. At this point it may be added by way of explanation that only one balancing head is necessary and that first one end of the body A is balanced and then the other end without removing the body from the cradle or turning it end for end. As previously stated the balancing head is provided with two spheres or balls of equal size and weight which, when the head is rotated, are free to assume angular positions in their raceway.

Assuming that the balls are first held in clutched position, i. e., in some fixed position in the race-way, while the body to be balanced is rotated above its critical speed, and then released, they will seek the side of the head corresponding to the lighter side of the body and may, for example, assume the positions indicated in Fig. 12. The clutch is then caused to grip and hold the balls in their adjusted positions, while the body is brought to rest, and in this manner the angle between them can be easily measured. If W represents the weight of one ball and R represents the radius to the center of a ball then the unbalance in the plane thereof will be $2WR$. $\cos (\phi/2)$ where $\phi$ is the angle subtended by the balls. Since the weights of the balls and their radius R may be measured and their product given a suitable constant, the sole variable for different values of unbalance in the plane of the head will be the cosine of ½ of the angle defined by the centers of the balls and the axis of rotation. The distance between the vertical plane of correction passing through the fulcra 19 and that of the balls and the radius of the body in the plane of correction can be measured and reduced to a constant whereby the unbalance in the body A may be measured in terms of the value of the cosine of one-half of the angle subtended by the balls. The foregoing is not intended as a complete description of all of the movements of the balls but as an approximate explanation of their essential movements. There are probably considerable oscillatory movements of the balls due to friction before they finally come to rest. Should their movements be too large a small amount of oil in the race will dampen them. It would appear where two or more spheres are provided that they would collect in one spot or position in the race way and be in contact with each other, and while the reason they do not is somewhat obscure it is a fact that they always do separate and by amounts varying with the unbalanced mass in the body A. I particularly wish to emphasize the fact that there are no limits imposed as to speed of rotation of the body A except that it shall be above its critical speed, and to the further fact that the critical speed may be made practically anything that is desired; also the fact that it is only necessary to revolve the body for a very brief period at the selected speed, whatever that may be, to allow the spheres to adjust themselves; that it unnecessary to vary the speed during the balancing operation and what is perhaps most important of all it is not necessary as a step in the method to repeat the rotation of the body in order to obtain the proper indications. Because the speed at which the body is rotated does not have to be varied up and down from a given value and does not have to be repeated, much time and money is saved in each balancing operation over the methods employed with certain other types of apparatus when such variations and repetitions are necessary and vital factors in the balancing operation.

Referring to Figs. 1 to 10, 30 indicates the main base or frame which in this case comprises a pair of heavy I-section beams which are supported by and anchored to a heavy concrete pillar or base so as to eliminate errors as fully as possible. The parts used in supporting the cradle which carries the body A that is to be balanced will next be described. Extending cross-wise of the base or frame are two bars 31 which are adjustable longitudinally of the frame and are held in adjusted position by screw actuated clamps 32 which engage the beveled under-surface of the front frame beam. The rear ends of the bars engage or hook under the beveled undersurface of the back frame member. The bars are made of sufficient width to form good bearing surfaces and to maintain them in planes which are at right angles to the frame. Mounted on each of the bars is a U-shaped member 33 which supports the outer ends of the cradle carrying springs 22 and 23 referred to in connection with Fig. 11. The springs 22 extend horizontally and the springs 23 vertically as best shown in Fig. 2. Each of these springs is provided with suitable means whereby their effective action can be adjusted as will appear later.

In addition there are two other bars 34, located between the first mentioned pair, and which are similarly supported. These bars are arranged to clamp the vertically extending flexible fulcrum members or supports 19, described in connection with Fig. 11, and which maintain the cradle at a fixed elevation, it being remembered that only one pair of such supports is used at a time. One of these supports is shown in detail in Fig. 3 wherein 16 indicates one of the side members of the cradle, 35 an adjustable clamp to which the upper end of the flexible support is secured. The lower end of the support, when in use, is held between the jaws 36 and 37, the former being a part of the bar 34, and the latter a separate piece which is moved into clamping position by the screw threaded end of the adjusting spindle 38. Between the jaws of the clamp is a thin flat spring 39 which acts as a damping device when the jaws are in the position shown to damp the irregular vibrations or oscillations of the end of the cradle when the indications as to the unbalance of the body A are being made. All four of the flexible supports are similarly provided with clamping devices and dampers.

On opposite sides of the devices thus far described are other and adjustable bars 40 which are normally clamped in fixed position on the frame. On each bar is a pair of vertical posts 41, one at each end, which support indicators 42 of any suitable construction which indicate the amplitude of the vibrations of the ends of the cradle adjacent thereto. The support for these indicators is shown in detail in Figs. 4 and 5. Mounted on the post is a head 24 in which the rod 43 that carries the indicator is adjustably clamped so that it can be moved back and forth into register with one of the side members of the cradle. 44 indicates the actuator of the indicator, the lower end of which rests on an arm 45, the latter being pressed against the head by a coiled spring 46 and adjusting screw. The purpose of this spring mounting of the arm is to dampen the vibrations or oscillations of the indicator needle and thereby make it easier to read. In other words, the small and rather delicate spring 44a and spring 46 prevents small and irregular vibrations of the cradle from disturbing the indicator and it also serves to permit a predetermined tolerance in amplitude of vibration due to unbalance without movement of the needle. Below the arm and resting on the cradle is a light compression spring 44a and through which the vibratory movements of the cradle are imparted to the indicator through the actuator 44.

It is desirable, though not essential, that the vibration of the cradle when the unbalanced body A is rotated, be equal in both horizontal and vertical directions, and for that reason it is desirable to have means for adjusting the number of turns or stiffness of springs 22. This may be done by any suitable or convenient means. The arrangements shown in Fig. 6 for the horizontal springs 22 and in Fig. 7 for the vertical springs have proved satisfactory in practice. Referring first to Fig. 6, 47 indicates a hollow tube-like member which is normally held in adjusted position by one of the split ends of the U-shaped member 33 and its clamping screw 33a, Fig. 2. The left hand end of the member has formed integral with it a split clamp 48, the peripheral surface of which is screw threaded to form a nut to receive the outer or right hand end of the spring. The interior of the member is threaded to receive the screw 47a, one end of which is conical and acts as an expander for the clamp, and the other end is provided with a knurled head 47b for turning it. Assuming that it is desired to change the effective length or stiffness of the spring, the screw 47a is backed out a short distance to relieve the pressure on the clamp or nut and cause it to release its grip on the spring. Clamping screw 33a of the support 33 is then released, and by rotating the tubular member 47 by means of the knurled head 47c the clamp or internal nut can be threaded into or out of the spring as occasion requires to change the effective action of the spring, after which the screw 33a is adjusted to clamp the member 47 and the screw 47a adjusted to expand the split clamp 48 and hold the end of the spring.

In Fig. 7 the upper end of each spring is fitted with a screw threaded plug 50 for attachment to a cross-member of the cradle. The lower end is provided with a fitting 51 which is held between the jaws of a split clamp 52 which in turn are held by a surrounding nut. The clamp is screw threaded at its lower end and is seated in the bottom part of one of the pair of U-shaped members 33. By loosening the jaw clamping nut and turning the screw the elevation of the cradle can be adjusted at will. A check nut is used to hold the clamp and screw in adjusted position.

The horizontal springs are preferably so adjusted as to effective length and stiffness that a selected point on one of the side bars of the cradle when an unbalanced body supported thereby is being rotated at balance speed will travel in a circle as distinguished from an ellipse, as would be the case with improper spring adjustment. In other words the idea is to have the total movements in a vertical plane equal those in a horizontal plane.

The balancing head B which carries the moving balls may be mounted in a variety of ways provided it is arranged to rotate and vibrate in synchronism with the body A. It comprises a disc 53 having a suitable hub and a rim 54 which on its inner surface has a carefully hardened and ground race-way 25 for the movable balls 26. The under surface of the rim, instead of being cylindrical is conical and enlarged to a slight extent toward the disc as is indicated by the broken and dotted lines in Fig. 8. The purpose of this is to cause the balls to follow the clutch when the latter is released. In the hub is located a suitable means for attaching the head to the shaft of body A. In this illustration of my invention it comprises a split-jaw clamp 53a which is tapered at one end and screw threaded at the other. By turning the clamp to move it inward the jaws are caused to grip the shaft of the body A. The disc is also provided with an extension 55 upon which is sleeved a clutch 56 comprising a thin disc having a backwardly beveled peripheral portion which engages and clamps the balls in their adjusted positions. The clutch is caused to rotate with the head through the medium of small guide pins 57 carried by the disc portion of the head. The clutching action is obtained by a light coiled spring 58 which is situated between the disc of the head and the clutch. The hub of the clutch is extended beyond the head, and in the outer end thereof are located one or more small anti-friction balls 59. The balls are located between the outer end of the head extension 55 and a screw 60 through which latter extends an actuator 61. The purpose of these small balls is to reduce the friction due to the movement of the actuator from affecting rotating movement of the parts and also to prevent wear. Assuming that the body A, balancing head B and clutch are rotating, the operator lightly presses the actuator 61: this moves the clutch bodily to the left on the extension 55 and releases the compensating weights or balls 26 which are then free to adjust themselves to whatever position is necessary to balance the body.

To ascertain the angular positions of the spheres or balls a special arrangement is provided, In the front of the head is a transparent disc 62 which is fastened to the rim at its periphery and at its center is supported by a hub 63 which is sleeved on the hub of the clutch. Inside the head in back of the transparent disc and mounted on the hub 63 is a scale disc 64, best shown in Fig. 10, which carries certain data to be mentioned later. This disc is angularly adjusted by the small knurled head 65 carried by the hub 63, a small friction washer 66 being interposed between it and the clamping ring of the transparent disc 62 to prevent accidental movements.

The scale disc has an outer scale reading from zero to 100 and covering an arc of 180°. Inside of this is a second scale also reading from zero to 100 and which covers an arc of 90°, the zeros of the two scales being aligned. These scales are designated "Near end" and are used in determining the angular relation of the spheres or balls when the end of the body A nearer the head is being balanced. Diametrically opposite the said inner scale is a second inner scale having the same characteristics and which is marked "Far end". This is used when the far end of the body is being balanced and is arranged on the opposite side of the axis of the head from the first mentioned inner scale which arrangement is made necessary by the change of position of the active fulcra 19. After the body A has stopped rotating the disc or dial is turned by hand to bring the zero of the near end scale into alignment with the left hand ball which means that the other ball will be aligned with some other indication on the scale. For example, assume one ball at zero and the other at 30 on the outer scale, a reading of 30 on the inner scale will be just one-half of the angular displacement or separation of the balls. This arrangement has the advantage that a direct reading may be obtained without depending upon the operator, thereby eliminating the chance for error. The use of the "Far end" scale is similar, the operator first determines the angular spacing of the balls and then reads one-half thereof on the scale. By turning this scale to the top by turning the body and head the reading may be used to indicate the axial plane in which the mass of the body A is to be changed.

It is necessary that the weight to be added be accurately located in position on the body A. To this end there is provided what in effect is an axially extending straight edge that can be aligned with the center of the angular space between the balls or weights within the balancing head, and which is so supported that it can be swung backward out of the way to permit the bodies A to be mounted in the cradle and removed therefrom. This is shown in Fig. 1 where 67 indicates a longitudinally extending bar, which is hinged or pivoted on the rod 67a so as to permit of being swung backward, the said rod being suitably supported from the frame of the machine. On the bar is a suitable number of adjustable holders 68, four being shown in the present instance, two to register with the balancing heads, one for each end if desired, and two with the body A where the weight or mass is to be changed. In each holder is mounted an indicator 69 which terminates in a definite aligning edge.

The body A is rotated in the cradle at the desired speed by suitable means as for example by the electric motor 70 through a light, strong belt 70a. To prevent any slight vibration of the motor from being transmitted to the frame and other parts and thus affect the delicacy of the reading, the motor is mounted on an elastic pad 71 which may be made of rubber or other suitable material. The pad and its motor are so supported that the motor can be moved to and fro to tighten or loosen the driving belt. For this purpose the motor is mounted on an auxiliary frame 72 which has guides 73 that are supported by the main frame. An adjusting screw is provided for moving the auxiliary frame back and forth, the handle for which is indicated at 74. The speed of the motor is controlled by suitable means, as for example by the adjustable rheostat 75 located on the front of the frame where it is convenient.

One method of operating my improved machine is as follows: The body A is mounted in the bearings in the cradle and connected to the motor by the belt 70a, the tension of which is suitably adjusted by moving the motor. The balancing head B is then mounted on the shaft of the body A, no attention being required as to its relative angular position thereon. The next step is to release the pair of fulcrum supports 19 nearest to the balancing head by opening the jaws 36—37 of the clamp. If necessary the horizontal springs 22 and the vertical spring 23 should be adjusted so that any given point on the part of the cradle adjacent the balancing head will move in a circle when the body A is rotated at balancing speed. Should the movements of the cradle which can be determined by the vibration indicators 42 prove to be unduly large they can be damped by increasing the friction of the springs 39 on the pair of fulcrum supports which for the moment are inactive as such, i. e., the pair nearest to the balancing head. When an unbalanced body is rotated at a slowly increasing or decreasing speed there is one speed at which the frequency of the oscillations of the body A is in synchronism with the natural oscillation frequency of the cradle. This speed is termed the "critical speed" and it is at the speed that the maximum amplitude of movement of the cradle is obtained. One end of the body is first balanced and then the other. The body is rotated above the critical speed and with it of course the balancing head. The operator then presses the actuator 61, Fig. 8, which opens the clutch and releases the balls 26 which thereupon assume different angular positions within the head, depending upon the magnitude of the unbalance in the body A. There are two forces acting on each of the two balls, one a centrifugal force tending to move the balls outwardly and the second a force acting on each ball in the direction of the center of gravity of the ball and the geometrical center of the race as distinguished from its actual center of rotation due to the unbalanced mass and equal in magnitude to the first force. The resultant of these two forces will be a force tending to move each ball along the race-way until they reach positions diametrically opposite the heavy side of the body A. The positions finally assumed by the balls are the only positions where the forces acting upon them are balanced, and therefore they remain in such positions while the body and head continue to rotate. When the balls are in this position the mass of body A is caused to rotate about its geometrical center which is the condition desired. The clutch 56 is then permitted to move outwardly and clamp the balls in their adjusted positions, after which the motor and body A are brought to rest. The operator then turns the body A and head by hand until the end pointer 69 is half way between the two balls in the head B. The adjacent pointer being aligned with the first will indicate the exact angular spot or position on the body A where additional weight is to be added in the first balancing plane, i. e., the one nearest to the balancing head. The scale disc 64 either before or after the body is turned by hand is rotated until the zero mark on the outer or main scale is opposite the center of the left hand ball and the angle between them is measured in one-hundredth of a half circle. One half of this reading as indicated by the inner scale gives the angular position for weight to be added to the body. The methods of determining this result and the amount of weight to be added have already been described. The character of the weight to be added will naturally vary with the type and nature of the body being balanced. For armatures for electric machines solder may be used and applied to the binding bands, to the ventilating fan or other suitable place.

Having thus determined the position and amount of weight to be added to the near end of the body A to balance it, it becomes necessary to balance the far end. This is done without in any way changing the position of the body A and the head B. The pair of fulcrum members 19 nearest the head B are clamped by turning the screws 38, and the pair of members at the far end are released by turning the screws in the same direction. Because the fulcra have been changed from end to end of the cradle and therefore occupy different relative positions to the head, it becomes necessary to use the scale marked "Far end" in Fig. 10. The balancing operation then proceeds as previously described, and when the final determinations are made as to amount of weight and its location, the weight is added to that part of the body A which is in the balancing plane registering with the farthest pair of fulcrum members 19 which, as above stated, are free to move in their clamps.

From the description heretofore given it will be apparent that the regions where the mass of the body A is to be changed for balancing purposes are located at the intersections of an axial plane which passes through a point madway between the balls and the transverse planes in which the fulcrum members are located. In changing the mass of body A, as by adding weight thereto, it is desirable to apply it as equally as possible about said points of intersection. Where the part of the body to which weight is to be added is narrow the weight may of course be longer than wide.

In Fig. 13 is shown an arrangement which is quite similar to the one shown in Fig. 1, the difference being that the head B has its own shaft 76 and bearings 77 therefor which latter are carried by the cradle. The shaft of the head is in axial alignment with that of the body A and the two are connected by a suitable coupling 78. The cradle which is of the same character as that previously described is shown in dotted lines in the interest of clearness.

It is desirable to make the head B as light and simple as possible. In Figs. 14 and 15 is shown a scale which instead of being mounted within and rotating with the head is entirely separate and removable therefrom, which arrangement does away with a number of the parts shown in Fig. 8. It comprises a cap-like member 79 which after the head stops rotating is slipped into place thereon and makes a good sliding fit with the peripheral surface thereof. On the front of the member are the "Near end" and "Far end" scales of the character previously described in connection with Fig. 10 and which are used in the same manner. In this case, however, I have elected to show the shorter scales on the outside and the long scale on the inside, and have omitted the words "Near end" as being unnecessary.

The paramount feature of my invention is the ability to quickly and easily determine the correct amount that the mass of the body is to be changed and the exact position where such change is to be made. A second and also outstanding feature of my invention is the ability to balance a rotating body without changing its position or without moving the balancing head, merely by releasing one pair of fulcrum members and clamping the other pair.

In every day actual practice I have repeatedly taken a coil wound armature of a dynamo electric machine weighing approximately 38 pounds and balanced it in 7 minutes which time included all the various operations including the mounting and removal of the armature from the cradle.

I have described my invention in connection with a horizontal machine as such machines have many advantages but my invention is also applicable to vertical shaft machines by making such simple changes as are necessary to support the body A in a vertical position.

What I claim as new and desire to secure by Letters Patent of the United States, is,—

1. In a balancing machine, the combination of a base, a cradle adapted to carry the body to be balanced, an elastic support for the cradle, which is carried by the base, a means for rotating the body at balancing speed, and a means connected with the body for rotation therewith which includes a weight that is free to adjust itself angularly with respect to said means to indicate the angular position where the mass of the body is to be changed to dynamically balance the same.

2. In a balancing machine, the combination of a base, a cradle adapted to carry the body to be balanced, an elastic support for the cradle, which is carried by the base, a means for rotating the body at balancing speed, and a means connected with the body for rotation therewith which includes weights that are free to adjust themselves angularly with respect to the means and each other to indicate the position and amount of the unbalanced mass of the rotating body.

3. In a balancing machine, the combination of a base, a cradle adapted to carry the body to be balanced, an elastic support for the cradle, which is carried by the base, a means for rotating the body at balancing speed, a head which is connected with the shaft of the body for rotation therewith, and spherical weights which are free to adjust themselves angularly with respect to the head and each other to indicate the position and amount of the unbalanced mass of the rotating body.

4. In a balancing machine, the combination of a base, a cradle adapted to carry the body to be balanced, an elastic means carried by the base for supporting the cradle, fulcrum means for one part of the cradle which hold said part at a fixed position with respect to the base, while permitting all other parts to oscillate freely under the effect of the unbalanced body, a means for rotating the body at balancing speed, a head which is adapted to be connected with the body for rotation therewith, and a weight carried by the head which is free to move angularly with respect thereto and the body to indicate the angular position where the mass of the body is to be changed to dynamically balance the same.

5. In a balancing machine, the combination of a base, a cradle adapted to carry the body to be balanced, an elastic means carried by the base for supporting the cradle, fulcrum means for the cradle which holds one point thereof in a fixed position with respect to the base, while permitting all other points to oscillate freely under the effects of the unbalanced body, a means for rotating the body at balancing speed, a head which is adapted to be mounted on the body and rotated therewith, and spherical weights which are free to adjust themselves with respect to the head and each other to indicate the angular position and amount that the mass of the body is to be changed to dynamically balance the same.

6. In a balancing machine, the combination of a base, a cradle adapted to carry the body to be balanced, sets of elastic means located near the ends of the cradle for supporting it, and which are carried by the base, fulcrum members arranged in pairs, each pair being in a plane which is perpendicular to the axis of the cradle and of the body, whereby the cradle is maintained at a fixed distance from the base, means by which each pair of members may at will be rendered ineffective as supports thereby permitting one end of the cradle to oscillate under the effects of the unbalanced mass of the body, a means for rotating the body in the cradle at balancing speed, a means supported by the cradle and connected to the body for rotation therewith, and a weight carried by the means which is free to adjust itself angularly with respect thereto to indicate the angular position where the mass of the body is to be changed to dynamically balance the same.

7. In a balancing machine, the combination of a base, a cradle adapted to carry the body to be balanced, sets of elastic means located near the ends of the cradle for supporting it, and which are carried by the base, fulcrum members arranged in pairs, each pair being in a plane which is perpendicular to the axis of the cradle and of the body, whereby the cradle is maintained at a fixed distance from the base, means by which each pair of members may at will be rendered ineffective as supports thereby permitting one end of the cradle to oscillate under the effects of the unbalanced mass of the body, a means for rotating the body in the cradle at balancing speed, a head adapted to be mounted on the shaft of the body for rotation therewith, said head having a circular race-way, and spherical weights arranged in the race-way which are free to adjust themselves angularly with respect to the head and each other to indicate the position and amount of the unbalanced mass of the rotating body.

8. In a balancing machine, a base, a cradle for rotatably supporting a body to be balanced, the cradle being oscillatably supported on the base, fulcrum members having provision for bending and twisting which are adjustable along the length of the cradle, and clamps adjustable along the length of the base for engaging the fulcrum members to pivotally support the cradle.

9. In a balancing machine, a base, a cradle for rotatably supporting a body to be balanced, means for resiliently supporting the cradle on said base, and members arranged in pairs and adjustable relative to the base and adapted to be located in selected correction planes normal to the axis of rotation of the body to be balanced, each of said pairs serving to hold one point of the cradle at a fixed distance from the base and together forming a pivotal support which permits the opposite end of the cradle to have two degrees of freedom.

10. In a balancing machine, a base, a cradle oscillatably supported on the base for rotatably supporting a body to be balanced, means adjustable along the base to selected correction planes and adapted to pivotally support the cradle, balancing means adapted to be mounted concentrically on the body to be balanced, said last-named means having balancing masses adapted to assume positions indicating the unbalance of the body.

11. In a balancing machine, the combination of a base, a cradle mounted to oscillate relative to the base and rotatably support a body to be balanced, means to pivotally connect the cradle and base so that the pivotal axis of the cradle may be within a radial plane of the rotatable body selected for application of a counter-balancing mass, and means adapted to be mounted concentrically on the body, said last-named means having balancing masses free to move in a circular path concentric with the axis of said body to positions indicating the unbalance of the body and adapted to be retained in such positions.

12. In a balancing machine, a cradle oscillatably supported on a base and adapted to rotatably support a body to be balanced, means for pivotally supporting the cradle on the base in either of two selected planes perpendicular to the axis of rotation of the body, and means for determining the position and amount of a correction weight to be applied in each of said planes, said last-named means comprising a head adapted to be concentrically mounted on the body and having two balancing masses which are free to move angularly within the head to positions varying with the extent of unbalance of the body.

13. In a balancing machine, a cradle oscillatably supported on a base and adapted to rotatably support a body to be balanced, means to pivotally support the frame on the base in either of two selected planes perpendicular to the axis of rotation of the body, and means for determining the position and amount of a correction weight to be applied in each of said planes, comprising a head adapted to be concentrically mounted on the body and having two balancing masses which may be clamped in position or freed to assume such positions that they balance the unbalanced mass in one end of the body when rotated at or above critical speed.

14. A balancing head for a dynamic balancing machine comprising an annular member, a ball-race formed thereon, a ball carried by the member which is free to adjust itself in the race-way with respect to the member as the latter is rotated, and a clutch which is operative to clutch and unclutch the ball while the member is rotating.

15. A balancing head for a dynamic balancing machine comprising a rotary support, a rim therefor, a race-way formed on the inner surface of the rim, balls in the race-way, a clutch moving with the head for releasably holding the balls, and means for imparting a predetermined axial direction of movement to the balls with respect to the clutch and the race-way when the clutch is opened to release the balls.

16. A balancing head for a dynamic balancing machine comprising an annular member, a ball-race formed thereon, balls carried by the member which are free to adjust themselves angularly in the race-way with respect to the member and to each other as the member is rotated, an axially movable clutch for the balls, and means for opening the clutch to permit the balls to adjust themselves in the race-way while the member is rotating and to close the clutch to hold the balls in their adjusted positions.

17. In a balancing machine, a head comprising a hollow casing member, means for mounting said head concentrically on a body to be balanced, a race-way formed in said member around its rim, a divisible mass mounted in the race-way, a clutch mounted in the member and rotatable therewith which is adapted to releasably retain said divisible mass in position, a means for releasing said clutch, and a scale for reading respective angular positions of the parts of the mass.

18. In a balancing machine, a head comprising a casing member, means for mounting the member concentrically on the body to be balanced, a race-way formed in said member inside of its rim, a plurality of spherical masses disposed in said race-way, a clutch for normally holding said masses in locked positions, and manually operable means for releasing said clutch and a scale adapted to be manually rotated relative to the casing member for reading the respective angular positions of the masses.

19. In a balancing machine, a head therefor comprising a casing, means for mounting the casing concentrically on the body to be balanced, spherical weights arranged at the same radial distance from axis of the head to automatically adjust themselves to such angular relation within the casing as to cause the head and body to rotate about their geometrical axis, and means to lock the spherical weights in the adjusted positions.

20. The method of dynamically balancing a rotative body which comprises connecting the body with a divided mass, the parts of which latter are arranged to take different angular positions, depending upon the unbalance of the body, rotating the body and mass at balancing speed, observing the relatively angular positions assumed by the parts of the mass, and changing the mass of the body by an amount and in a place determined by the positions of the parts of the divided mass.

21. The method of dynamically balancing a rotative body which comprises connecting the body with an element which carries freely movable weights, rotating the body and element above the critical speed of the assemblage to permit the weights to take different angular positions around the element, observing the positions of the weights, changing the mass at one end of the body in an axial plane which passes midway between the positions taken by the weights, and repeating the operation for the other end of the body without removing the element.

22. The method of balancing a rotative body, which comprises oscillatably supporting the body and rotating the same above the critical speed with a mass constrained to move in a circular path concentric with the geometrical axis of said body and which is free to change its angular position with respect to the body by an amount depending upon the unbalance of the mass of the body, and holding the mass in the stable position it automatically assumes relative to the body to indicate the angular position where the mass of the body is to be changed.

23. The method of balancing a rotative body, which comprises oscillatably supporting the body and rotating the same above the critical speed with a divisible mass restricted to move in a circular path concentric with the geometrical axis of said body and releasably fixed in position in the path relative to said body, releasing said mass from its fixed condition and fixing the components of said mass in the stable positions which they automatically assume relative to said body.

24. The method of determining the position and amount of a correction weight for an unbalanced body which comprises associating with the body a divisible mass the parts of which have an aggregate weight greater than the equivalent amount of unbalance of the body and which are constrained to move in a circular path concentric with the geometrical axis of said body, oscillatably supporting the body and mass, rotating the same in synchronism above their critical speed, freeing a part of the mass from its condition of synchronism with the body until the components of said mass assume stable positions in said circular path, and fixing the components in their stable positions.

25. In a method of balancing a rotative body, the step which consists in determining the position of a correction weight for said body by causing a divided mass to be restrained to a circular path concentric with the geometrical axis of the body while permitting the parts of the mass to freely move circumferentially in said path, rotating the body and mass above the critical speed while they are oscillatably supported and observing the position that the parts of the mass automatically assume relative to the body.

26. In a method of balancing a rotative body, the step which consists in determining the position and amount of a correction weight by causing a divided mass to be retained in a circular path concentric with the geometrical axis of the body, rotating the body and the divided mass above the critical speed while they are oscillatably supported and observing the positions that the components of the mass automatically assume relative to the body.

27. In a dynamic balancing machine, the combination of a base, a cradle adapted to carry the body to be balanced, an elastic support for the cradle which is carried by the base, a motive power agency for rotating the body at balancing speed, a balancing head adapted to be rotated with the body, movable weights carried by the head which automatically adjust themselves to positions which differ angularly with respect to each other and the head depending upon the amount of unbalance in the body, and indicator means which when aligned with the mid-position between the weights indicates the point or points where the mass of the body is to be changed.

28. The method of dynamically balancing a rotating body which comprises associating therewith independently movable weights, spinning the body and weights at a speed sufficiently high as to cause them to rotate about the center of the mass as distinguished from the geometrical center thereof, restraining one end of the body while permitting the other end to freely vibrate and the weights to independently adjust themselves to different angular positions, noting the angular relation of the weights, and changing the mass of the body in accordance with the positions of the weights.

29. In an apparatus of the character described, the combination of a base, a cradle comprising a pair of side members, cross members secured thereto for supporting the body to be balanced, releasable fulcrum members whereby a chosen point of the cradle may be held at a fixed distance from the base while permitting the other end to vibrate with two degrees of freedom under the influence of the body being balanced, and sets of springs for supporting each end of the cradle, certain of which restrain the cradle against movements in one plane and the remainder in a plane perpendicular to the first.

30. In a dynamic balancing machine, the combination of a base, means carried by the base which support the body being balanced in such manner that at one point the axis of the body is held in fixed position to form a pivot while all other parts thereof are free to vibrate with two degrees of freedom in response to lack of balance of its mass, a means for rotating the body at balancing speed, a head connected with the body for rotation therewith, a divided weight which is supported by and rotates with the head, said weights automatically assuming different angular positions on the head at the same radial distance from the axis thereof, and indicating by said positions the region where and amount by which the mass of the body requires to be changed to dynamically balance the same.

31. In a balancing machine, the combination of a base, a pair of means carried by the base for elastically supporting the body to be balanced at two spaced points, each of said means permitting the body to vibrate with two degrees of freedom, devices whereby the elastic effect of each of said means may alternately be controlled at will, a head connected to the body to rotate therewith and which has the same axis of revolution, and weights carried by the head which automatically and independently move in a circular path of constant radius to positions where they remain stationary with respect to the head, the arc subtended by the weights depending upon the lack of dynamic balance of the body, whereby an axial plane passing midway betwen the weights will indicate the region of the body where its mass requires to be changed to dynamically balance the same.

32. In a balancing machine, the combination of a pair of spaced, spring supported bearings for the body to be balanced, said springs being capable of yielding in response to an unbalance of the mass in the body when the latter is rotated at the critical speed due to its mounting, a means for holding one of the bearings in fixed position while permitting the other to move in response to the effects of unbalanced mass in the body, means for rotating the body, a head which is rotated with the body and freely movable balls carried by the head which automatically adjust themselves to different angular positions determined by the amount of unbalanced mass in the body being balanced.

33. In a balancing machine, the combination of a pair of spaced elastic supporting means for the body to be balanced, means whereby one point in the axis of the body being balanced may be held in fixed position while all other points are free to move with two degrees of freedom, means for damping the movements of the free support, means for rotating the body at balancing speed, a head rotating with the body, weights carried by the head, said weights being free to adjust themselves independently of each other to compensate for the lack of dynamic balance of said body at its free end, and means for alternately clutching and releasing the weights while the head is revolving.

34. In a balancing machine, the combination of an element which is subject to vibration when the body to be balanced is rotated, a vibration indicator having an actuator, a means engaging the actuator and through which vibrations of the element are imparted to the indicator, and a device which acts on said means to damp its movements.

35. In a balancing machine, the combination of an element which is subject to vibration when the body to be balanced is rotated, a vibration indicator having an actuator, a means engaging the actuator and through which vibrations of the element are imparted to the indicator, a device which acts on said means to damp its movements, and a light spring means interposed between the vibrating element and the actuator engaging means.

36. In a balancing machine, the combination of a base, a pair of spaced spring supported bearings for the body to be balanced, carried by the base, means whereby one of the bearings is held in fixed position while the other is free, means for rotating the body, at balancing speed, a head rotating with the body, weights rotating with the head which are movable independently of each other and the head to compensate for the lack of balance of the body, means for clutching the weights in their respective adjusted positions while the head is rotating, and scale means associated with the head whereby the angular disposition of the weights may be determined.

37. The method of dynamically balancing a rotating body which comprises supporting the body in such manner that a fixed pivotal point in the axis of the body is established, the remainder of the body being permitted to vibrate about said point as a pivot with two degrees of freedom, associating freely movable weights with the body which have a common axis, rotating the body and weights at balancing speed to permit the weights to adjust themselves circumferentially, noting the relative positions of the weights while the body is rotating, stopping the body and correcting the unbalanced mass thereof in one region in accordance with the indications given by the weights, shifting the pivotal point axially to a new position, again revolving the body at balancing speed, noting the relative positions of the weights while the body is rotating, stopping the body and finally correcting the unbalanced mass in a second region displaced from the first in accordance with the second indications given by the weights.

In witness whereof, I have hereunto set my hand this 1st day of July, 1929.

ERNEST L. THEARLE.